(12) United States Patent
Riben et al.

(10) Patent No.: US 7,548,816 B2
(45) Date of Patent: Jun. 16, 2009

(54) METHOD AND APPARATUS FOR GENERATING AND SECURELY DISTRIBUTING LONG-TERM SATELLITE TRACKING INFORMATION

(75) Inventors: Matthew Riben, Cupertino, CA (US); Sergei Podshivalov, San Jose, CA (US); Frank van Diggelen, San Jose, CA (US); Charles Abraham, Los Gatos, CA (US)

(73) Assignee: Global Locate, Inc., San Jose, CA (US)

( * ) Notice: Subject to any disclaimer, the term of this patent is extended or adjusted under 35 U.S.C. 154(b) by 469 days.

(21) Appl. No.: 11/277,943

(22) Filed: Mar. 29, 2006

(65) Prior Publication Data
US 2007/0192029 A1  Aug. 16, 2007

Related U.S. Application Data (63) Continuation-in-part of application No. 11/333,787, filed on Jan. 17, 2006, now Pat. No. 7,443,340, which is a continuation-in-part of application No. 09/993,335, filed on Nov. 6, 2001, now Pat. No. 7,053,824, which is a continuation-in-part of application No. 09/884,874, filed on Jun. 19, 2001, now Pat. No. 6,560,534, which is a continuation-in-part of application No. 09/875,809, filed on Jun. 6, 2001, now Pat. No. 6,542,820.

(51) Int. Cl.
*G01C 21/00* (2006.01)
(52) U.S. Cl. ........................ 701/213; 701/200
(58) Field of Classification Search ............... 701/200, 701/208, 213–215; 342/357.06, 357.12; 340/988
See application file for complete search history.

(56) References Cited

U.S. PATENT DOCUMENTS

| 4,445,118 | A | 4/1984 | Taylor et al. |
| 4,894,662 | A | 1/1990 | Counselman |
| 5,043,736 | A | 8/1991 | Darnell et al. |

(Continued)

FOREIGN PATENT DOCUMENTS

| CA | 2177310 | | 12/1996 |
| EP | 1197761 | A | 4/2002 |
| GB | 2307812 | A | 6/1997 |
| WO | WO-8912835 | A1 | 12/1989 |
| WO | WO-9809181 | A1 | 3/1998 |
| WO | WO-9919743 | A1 | 4/1999 |
| WO | WO-0175473 | A2 | 10/2001 |
| WO | WO-02/103383 | | 12/2002 |

OTHER PUBLICATIONS

*International Search Report* mailed Aug. 21, 2003 for PCT Application No. PCT/US02/35311.
Cameron, M., et al., "Intelligent Transportation System Mayday Becomes a Reality", *Navsys Corporation*, IEEE 1985, 340-347.

(Continued)

*Primary Examiner*—Yonel Beaulieu
(74) *Attorney, Agent, or Firm*—McAndrews Held & Malloy, Ltd.

(57) ABSTRACT

A method and apparatus for generating and distributing satellite tracking data to a remote receiver is disclosed. The method for includes extracting from memory at least a portion of long-term-satellite-tracking data, generating formatted data from the at least a portion of long-term-satellite-tracking data, the formatting data being in a format supported by the remote receiver, applying security to the formatted data to prevent unauthorized access to and/or tampering with the at least a portion of long-term-satellite-tracking data; and transmitting the formatted data to the remote receiver.

44 Claims, 7 Drawing Sheets

U.S. PATENT DOCUMENTS

| | | | |
|---|---|---|---|
| 5,223,844 A | 6/1993 | Mansell et al. | |
| 5,365,450 A | 11/1994 | Schuchman et al. | |
| 5,408,237 A | 4/1995 | Patterson et al. | |
| 5,417,217 A | 5/1995 | Morita et al. | |
| 5,418,537 A | 5/1995 | Bird | |
| 5,430,657 A | 7/1995 | Kyrtsos | |
| 5,506,781 A | 4/1996 | Cummiskey et al. | |
| 5,589,833 A | 12/1996 | Randall et al. | |
| 5,663,735 A | 9/1997 | Eshenbach | |
| 5,673,256 A | 9/1997 | Maine | |
| 5,726,893 A | 3/1998 | Schuchman et al. | |
| 5,786,789 A | 7/1998 | Janky | |
| 5,828,336 A | 10/1998 | Yunck et al. | |
| 5,841,396 A | 11/1998 | Krasner | |
| 5,845,227 A | 12/1998 | Peterson | |
| 5,877,724 A | 3/1999 | Davis | |
| 5,913,170 A | 6/1999 | Wortham | |
| 5,938,721 A | 8/1999 | Dussell et al. | |
| 5,943,014 A | 8/1999 | Gilhousen | |
| 5,963,167 A | 10/1999 | Lichten et al. | |
| 5,983,109 A | 11/1999 | Montoya | |
| 5,999,124 A | 12/1999 | Sheynblat | |
| 6,064,336 A | 5/2000 | Krasner | |
| 6,067,045 A | 5/2000 | Castelloe et al. | |
| 6,081,229 A | 6/2000 | Soliman et al. | |
| 6,084,544 A | 7/2000 | Camp, Jr. | |
| 6,097,974 A | 8/2000 | Camp, Jr. et al. | |
| 6,107,960 A | 8/2000 | Krasner | |
| 6,121,923 A | 9/2000 | King | |
| 6,122,506 A | 9/2000 | Lau et al. | |
| 6,131,067 A | 10/2000 | Girerd et al. | |
| 6,133,874 A | 10/2000 | Krasner | |
| 6,134,483 A | 10/2000 | Vayanos et al. | |
| 6,150,980 A | 11/2000 | Krasner | |
| 6,178,195 B1 | 1/2001 | Durboraw, III et al. | |
| 6,188,351 B1 | 2/2001 | Bloebaum | |
| 6,204,808 B1 | 3/2001 | Bloebaum et al. | |
| 6,211,819 B1 | 4/2001 | King | |
| 6,215,441 B1 | 4/2001 | Moeglein et al. | |
| 6,215,442 B1 | 4/2001 | Sheynblat et al. | |
| 6,222,483 B1 | 4/2001 | Twitchell et al. | |
| 6,239,742 B1 | 5/2001 | Krasner | |
| 6,256,475 B1 | 7/2001 | Vannucci | |
| 6,272,316 B1 | 8/2001 | Wiedeman et al. | |
| 6,285,315 B1 | 9/2001 | Pratt | |
| 6,289,279 B1 | 9/2001 | Ito et al. | |
| 6,313,787 B1 | 11/2001 | King et al. | |
| 6,323,804 B1 | 11/2001 | Kurby et al. | |
| 6,369,751 B1 | 4/2002 | Naruse | |
| 6,377,585 B1 | 4/2002 | Funderburk et al. | |
| 6,411,892 B1 | 6/2002 | van Diggelen | |
| 6,411,899 B2 | 6/2002 | Dussell et al. | |
| 6,433,735 B1 | 8/2002 | Bloebaum et al. | |
| 6,453,237 B1 | 9/2002 | Fuchs et al. | |
| 6,542,820 B2 | 4/2003 | LaMance et al. | |
| 6,560,534 B2* | 5/2003 | Abraham et al. | 701/213 |
| 6,642,884 B2 | 11/2003 | Bryant et al. | |
| 6,693,882 B1 | 2/2004 | Gu et al. | |
| 6,725,159 B2 | 4/2004 | Krasner | |
| 6,799,116 B2 | 9/2004 | Robbins | |
| 6,813,560 B2 | 11/2004 | van Diggelen et al. | |
| 6,829,535 B2* | 12/2004 | van Diggelen et al. | 701/213 |
| 6,856,282 B2 | 2/2005 | Mauro et al. | |
| 7,020,555 B1 | 3/2006 | Janky et al. | |
| 2002/0032526 A1 | 3/2002 | van Diggelen | |
| 2002/0049536 A1 | 4/2002 | Gaal | |
| 2002/0172313 A1 | 11/2002 | Smith et al. | |
| 2002/0188403 A1* | 12/2002 | LaMance et al. | 701/213 |
| 2002/0198657 A1 | 12/2002 | Robbins | |
| 2003/0098810 A1 | 5/2003 | Lee et al. | |
| 2003/0212821 A1 | 11/2003 | Gillies et al. | |
| 2003/0223422 A1 | 12/2003 | Igarashi et al. | |
| 2004/0203853 A1 | 10/2004 | Sheynblat | |
| 2004/0203915 A1 | 10/2004 | van Diggelen et al. | |
| 2004/0263386 A1* | 12/2004 | King et al. | 342/357.06 |
| 2005/0003833 A1 | 1/2005 | Younis | |

OTHER PUBLICATIONS

Dietrich, F. J., "The Globalstar Cellular Satellite System", *IEEE Transaction on Antennas and Propagation*, 46 (6), Publisher item Identifier S 0018-926X(98), (Jun. 1998), 935-942.

Djuknic, Goran M., et al., "Geolocation and Assited GPS", *Computer* vol. 34, Issue 2 (Feb. 2001), 123-125.

Johnson, LT. Gregory W., "Communications Technologies for Automated Dependent Surveillance", *USCG Research & Development Center* (1995), 40-44.

Makino, H., "Development of Navigation System for the Blind Using GPS and Mobile Phone Combination", *18th Annual International Conference of the IEEE Engineering in Medicine and Biology Society* (1996), 506-507.

Sennott, DR., J. W., "A High Performance Position Tracker for Embedded Paging, Cellular Telephone, and Law Enforcement Applications". *Department of Electrical and Computer Engineering and Technology, IEEE 1992*, 96-103.

Stewart, J. M., "Vehicle Location and Position Monitoring System Using Satellite Navigation and Cellular Telephone", *LITEF GmbH*, 7 & 1-15.

Sturza, M. A., "Architecture of the Teledesic Satellite System", *Teledesic Corporation*, 1-7.

Van Diggelen, Frank, "Global Locate Indoor GPS Chipset & Services", *Jon GPS 2001*, Sep. 11-14, 2001, Salt Lake City, UT, USA, (Online) Sep. 11, 2001, pp. 1515-1521, XP002358532 Retrieved from the Internet: URL:http://ww.ion.org/:: (retrieved on Dec. 9, 2005).

Wheatley, C., "CDMA's Dependence on Good Timing and Related Issues", *IEEE International Frequency Control Symposium*, Qualcomm Incorporated (1996), 1211-1218.

Zhao, Y., "Efficient and Reliable Data Transmission for Cellular-and-GPS-Based Mayday Systems", *Motorola, Inc., Chicago Corporate Research Laboratories*, IEEE 1998, 555-559.

International Search Report mailed Jul. 10, 2007 for PCT Application No. PCT/US2007/001187.

Written Opinion mailed Jul. 10, 2007 for PCT Application No. PCT/US2007/001187.

* cited by examiner

| OTD FOR SATELLITE PRN 1, WEEK 1115 | | | | |
|---|---|---|---|---|
| TIME OF WEEK (SECONDS) | SATELLITE POSITION X (METERS) | SATELLITE POSITION Y (METERS) | SATELLITE POSITION Z (METERS) | SATELLITE CLOCK OFFSET (SECONDS) |
| 560400.0 | 15121094.3 | -6269504.8 | -20691762.4 | 0.000179930409 |
| 560460.0 | 15333252.6 | -6166907.8 | -20632874.0 | 0.000179930408 |
| 560520.0 | 15455578.4 | -6065020.3 | -20572383.0 | 0.000179930408 |
| 560580.0 | 15577888.4 | -5963848.4 | -20510294.2 | 0.000179930407 |
| 560640.0 | 15700169.1 | -5863397.7 | -20446612.6 | 0.000179930407 |

METHOD AND APPARATUS FOR GENERATING AND SECURELY DISTRIBUTING LONG-TERM SATELLITE TRACKING INFORMATION

CROSS-REFERENCE TO RELATED APPLICATIONS

This application is a continuation-in-part application of U.S. patent application Ser. No. 11/333,787 filed Jan. 17, 2006, now U.S. Pat. No. 7,443,340, which is a continuation-in-part application of U.S. patent application Ser. No. 09/993,335, now U.S. Pat. No. 7,053,824, filed Nov. 6, 2001, which is a continuation-in-part of U.S. patent application Ser. No. 09/884,874, filed Jun. 19, 2001, now U.S. Pat. No. 6,560,534, which is a continuation-in-part of U.S. patent application Ser. No. 09/875,809, filed Jun. 6, 2001, now U.S. Pat. No. 6,542,820. This application contains subject matter that is related to U.S. patent application Ser. No. 09/715,860, filed Nov. 17, 2000, now U.S. Pat. No. 6,417,801. Each of the aforementioned related patents and/or patent applications is herein incorporated by reference.

BACKGROUND OF THE INVENTION

1. Field of the Invention

The present invention generally relates to generating satellite tracking information for earth orbiting satellites. More specifically, the invention relates to a method and apparatus for generating and distributing satellite tracking information through a network or communications link.

2. Description of the Related Art

A positioning receiver for the Global Positioning System (GPS) uses measurements from several satellites to compute a position. The process of acquiring the GPS radio signal is enhanced in speed and sensitivity if the GPS receiver has prior access to a model of the satellite orbit and clock. This model is broadcast by the GPS satellites and is known as an ephemeris or ephemeris information. Each satellite broadcasts its own ephemeris once every 30 seconds. Once the GPS radio signal has been acquired, the process of computing position requires the use of the ephemeris information.

The broadcast ephemeris information is encoded in a 900 bit message within the GPS satellite signal. It is transmitted at a rate of 50 bits per second, taking 18 seconds in all for a complete ephemeris transmission. The broadcast ephemeris information is typically valid for 2 to 4 hours into the future (from the time of broadcast). Before the end of the period of validity the GPS receiver must obtain a fresh broadcast ephemeris to continue operating correctly and produce an accurate position. It is always slow (no faster than 18 seconds), frequently difficult, and sometimes impossible (in environments with very low signal strengths), for a GPS receiver to download an ephemeris from a satellite. For these reasons it has long been known that it is advantageous to send the ephemeris to a GPS receiver by some other means in lieu of awaiting the transmission from the satellite. U.S. Pat. No. 4,445,118, issued Apr. 24, 1984, describes a technique that collects ephemeris information at a GPS reference station, and transmits the ephemeris to the remote GPS receiver via a wireless transmission. This technique of providing the ephemeris, or equivalent data, to a GPS receiver has become known as "Assisted-GPS." Since the source of ephemeris in Assisted-GPS is the satellite signal, the ephemeris information remains valid for only a few hours. As such, the remote GPS receiver must periodically connect to a source of ephemeris information whether that information is received directly from the satellite or from a wireless transmission. Without such a periodic update, the remote GPS receiver will not accurately determine position.

The deficiency of the current art is that there is no source of satellite trajectory and clock information that is valid for longer than a few hours into the future, and it can be expensive to send the ephemeris information repeatedly to the many remote devices that may need it. Moreover, mobile devices may be out of contact from the source of the Assisted-GPS information when their current ephemeris becomes invalid.

Therefore, there is a need in the art for a method and apparatus for providing satellite trajectory and clock information that is valid for an extended period into the future, e.g., many days into the future.

SUMMARY OF THE INVENTION

The present invention is a method and apparatus for generating satellite tracking data (STD) that is valid for extend periods of time into the future, i.e., long term STD or LT-STD. The STD may contain future satellite trajectory information and/or satellite clock information. The STD is derived by receiving at one or more satellite tracking stations the signals from at least one satellite and determining satellite tracking information (STI) from the received signals. STI contains present satellite orbit trajectory data and satellite clock information.

The STD may be provided to a remote satellite signal receiver via a network or communications system. The satellite system may include the global positioning system (GPS), GLONASS, GALILEO, or other satellite systems that may use STD to enhance the performance of the receiver. By using the LT-STD, a remote receiver may accurately operate for days without receiving an update of the broadcast ephemeris information as normally provided from the satellites.

As an example, a method for distributing LT-STD to a remote receiver is disclosed herein. This method may include functions for extracting from memory at least a portion of the LT-STD; generating formatted data from such LT-STD so that the formatted data is in a format supported by the remote receiver, applying security to the formatted data to prevent unauthorized access to the LT-STD, and transmitting the formatted data to the remote receiver. The function of applying security to the formatted data may include applying any of cryptosecurity, transmission security, emission security, and traffic-flow security; any or all of which may use encryption. The function of applying security to the formatted data also operates to ensure to the remote receiver that the LT-STD is unadulterated.

The method may also include receiving from the remote receiver a request for security credentials for removing the security from the formatted data, ensuring that payment for the remote receiver to obtain the LT-STD is accounted for, and sending to the remote receiver the security credentials. The payment for the remote receiver to obtain the LT-STD may be a fee arrangement.

The method may further include the functions of sending to the remote receiver a request for information to substantiate that the remote receiver is authorized to access the LT-STD, receiving from the remote receiver the information to substantiate that the remote receiver is authorized to access the LT-STD. This information may include information to validate the payment for the remote receiver to obtain the at least a portion of long-term-satellite-tracking data.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
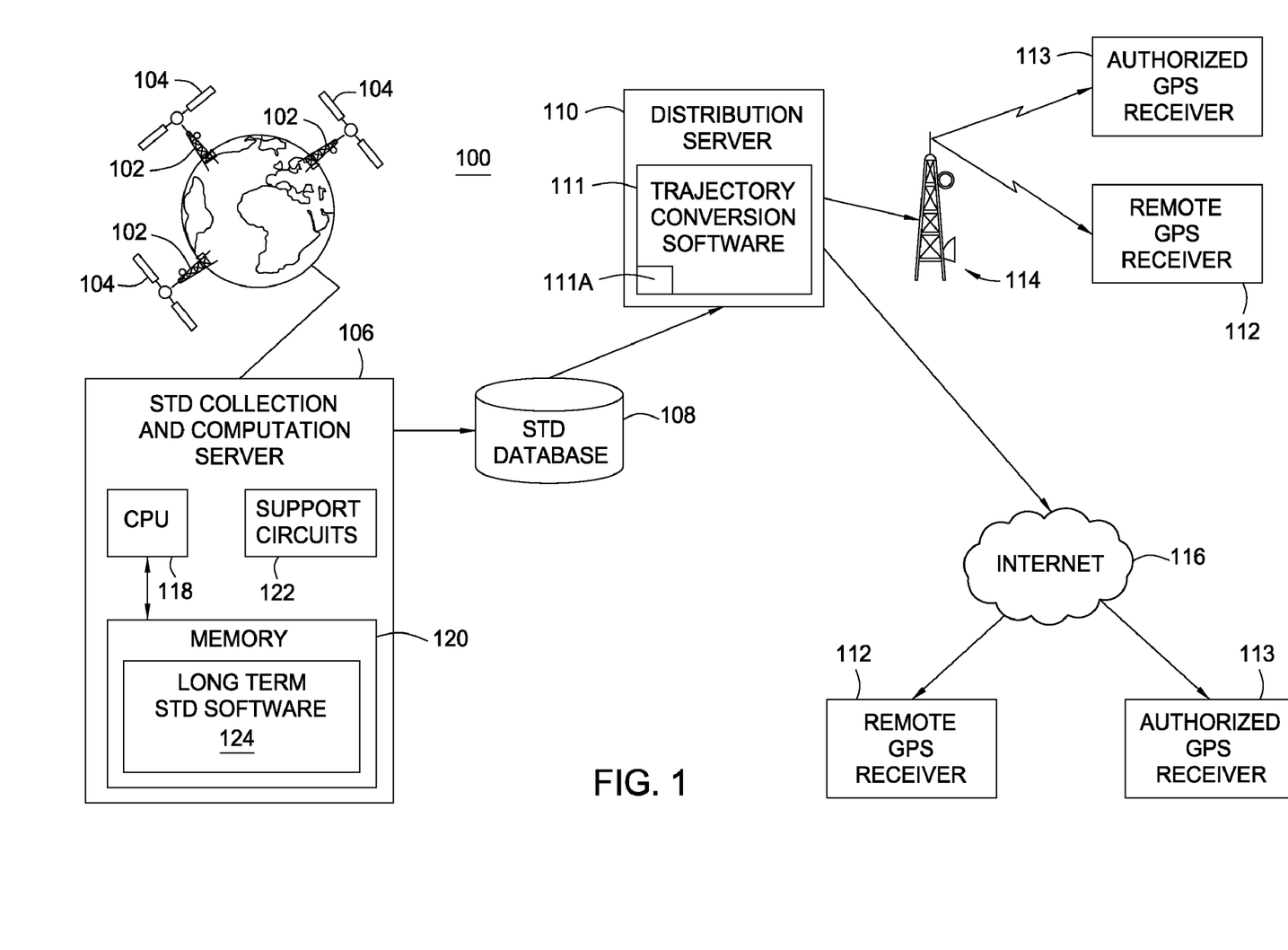
FIG. 1 depicts a system for creating and distributing satellite tracking data (STD) to remote GPS receivers.

FIG. 1 depicts a block diagram of a system 100 for creating and distributing satellite tracking data (STD). The satellite system may include the global positioning system (GPS), GLONASS, GALILEO, or other satellite systems that may use STD to enhance the performance of the receiver. The following disclosure uses GPS as an illustrative system within which the invention operates. From the following disclosure, those skilled in the art will be able to practice the invention in conjunction with other satellite systems.

A network of GPS tracking stations 102 is used to collect measurement data from the GPS satellites 104. Such a network is described in detail in U.S. patent application Ser. No. 09/615,105, filed Jul. 13, 2000, now U.S. Pat. No. 6,411,892. The network could comprise several tracking stations that collect satellite tracking information (STI) from all the satellites in the constellation, or a few tracking stations, or a single tracking station that only collects STI for a particular region of the world.

An STD collection and computation server 106 collects and processes the measurement data (this measurement data is referred to herein as satellite tracking information (STI) that includes at least one of: code phase measurements, carrier phase measurements, Doppler measurements, or ephemeris data). In the preferred embodiment, measurement data is obtained from both the L1 and L2 frequencies on which the GPS satellites transmit. Alternative embodiments may use only one of these frequencies, and/or other frequencies used by other satellite systems or by future versions of the GPS system.

The server 106 via its logic, and in particular, its LT-STD software 124 (described below) continuously or, alternatively, periodically produces a set of long term satellite tracking data (LT-STD) that includes: 1) accurate satellite tracking data (STD) (e.g., a trajectory of each satellite and/or a clock offset measurement) during the data collection period, 2) a prediction of the future STD of each satellite, and 3) models that match the future STD of each satellite.

In addition to any firmware and software, such as the LT-STD software 124, the logic of the server 106 also includes a central processing unit (CPU) 118, support circuits 122, and memory 120. The CPU 118 may be any one of the many CPUs available on the market to perform general computing. Alternatively, the CPU may be a specific purpose processor such as an application specific integrated circuit (ASIC) that is designed to process satellite tracking information. The support circuits 122 are well known circuits such as clock circuits, cache, power supplies and the like. The memory 120 may be read only memory, random access memory, disk drive storage, removable storage or any combination thereof. The memory 120 stores executable software or instructions, e.g., LT-STD software 124, that, when executed by the CPU 118, causes the system 100 to operate in accordance with the present invention.

The logic of the server 106 may also include an input/output interface ("I/O") (not shown). The I/O interface provides an interface to control the transmissions of digital information between I/O devices (not shown) contained within, associated with or otherwise attached to the server 106, between components of the server 106 (shown and not shown) and/or between other components of the system 100. The I/O devices (not shown) may be embodied as any or any combination of (i) storage devices, including but not limited to, a tape drive, a floppy drive, a hard disk drive or a compact disk drive, (ii) a receiver, (ii) a transmitter, (iii) a speaker, (iv) a display, (v) a speech synthesizer, (vi) an output port, and (vii) a user input device, including a keyboard, a keypad, a mouse and the like.

The LT-STD produced by the LT-STD software 124 is stored in an STD database 108. As described in more detail below, a distribution server 110 is operable to perform a distribution process for distributing the LT-STD information to GPS receivers 112 and/or authorized GPS receivers 113 over a communication network, such as wireless communications system 114 and/or the Internet 116.

The distribution server 110 includes logic in the form of software, firmware and/or hardware (e.g., CPU, support circuits, memory, I/O interface, I/O devices, etc.) substantially similar to the server 106; excluding the logic for performing functions particular to server 106 and including logic for executing executable software or instructions that, when executed by the its CPU (not shown), causes the distribution server 110 to operate in accordance with the present invention. The details of the logic of the distribution server 110, however, are not iterated here so as to not obscure the present disclosure.

Figure 7:
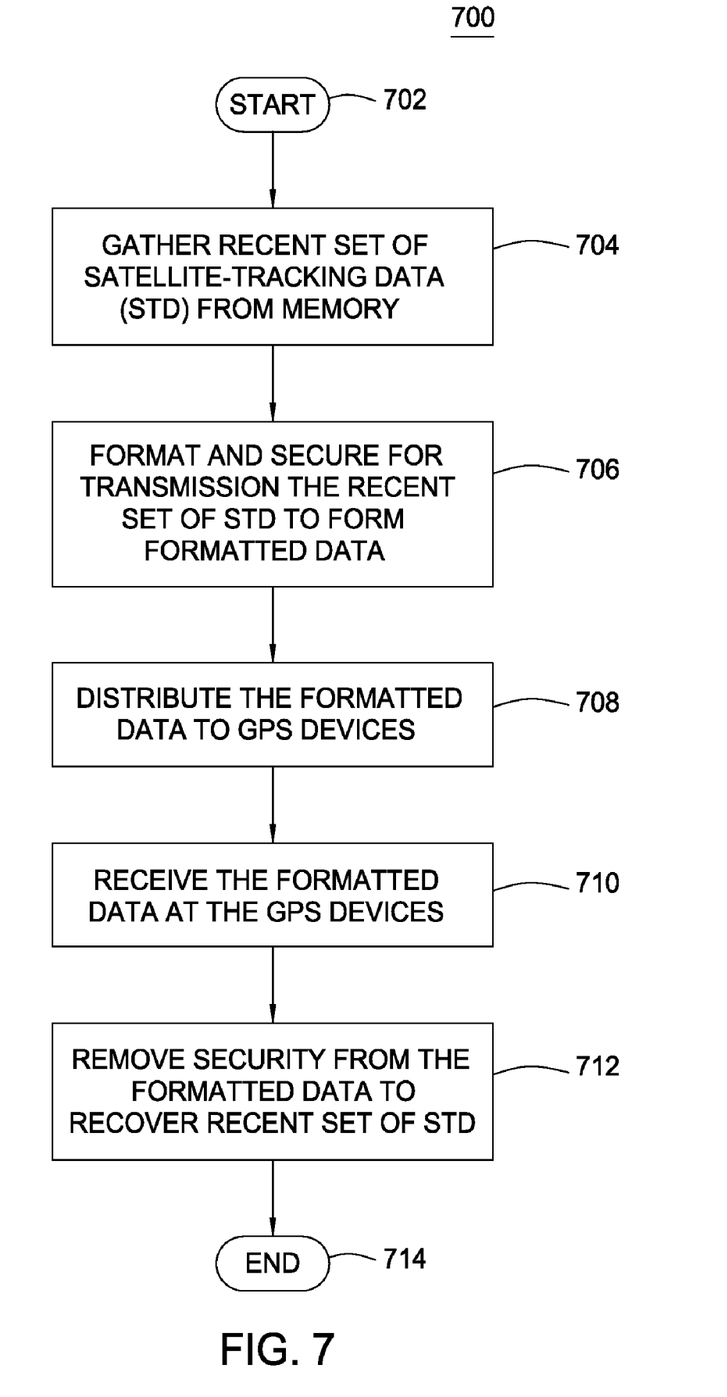
FIG. 7 is a flow diagram illustrating an example of a distribution process for distributing long-term STD information.

Referring now to FIG. 7, a flow diagram illustrating an example of a distribution process 700 for distributing LT-STD information is shown. Although this distribution process 700 may be performed by any number of architectures, the distribution process 700 is described with reference to the system 100 of FIG. 1 for convenience.

The distribution process starts at termination block 702 and transitions to process block 704 at which the distribution server 110 accesses (e.g., queries and received from) the STD database 108 to gather a recent (e.g., the most) set of the LT-STD. After process block 706, the distribution server 110 uses trajectory-conversion software 111 to format, and if desired, to secure via a security module 111a this recent set of LT-STD so as to form a set of formatted data (collectively "formatted data"), as shown in process block 706. The trajectory-conversion software 111 and security module 111a may format and secure the formatted data according to a communication protocol and/or security protocol, respectively.

The security protocol may include any standard, non-standard and/or proprietary measure, control and/or rule (collectively "security directives") for denying unauthorized entities (man or machine) from accessing, modifying and/or adulterating the recent set of data underlying the formatted data. Such security directives are devised, however, so as to ensure to the authorized GPS devices 113 (i.e., GPS devices that are authorized to obtain the formatted data) that the recent set of LT-STD underlying the formatted data is authentic, unmodified and/or unadulterated.

To facilitate such functions, the security directives may employ cryptosecurity, transmission security, emission security, traffic-flow security and/or physical security; any and all of which may use cryptography and/or cryptology (e.g., encryption and decryption techniques). Details of the cryptosecurity, transmission security, emission security, traffic-flow security, cryptanalysis, and/or physical security may be found in Federal Standard 1037C Glossary of Telecommunications Terms, which is incorporated herein by reference, and available from the National Communications System, ATTN: Ms J. Orndorff, 701 S. Courthouse Rd., Arlington, Va. 22204-2198. Telephone: (703) 607-6204.

Although the security protocol is discussed herein as being separate from the relevant communication protocol, the security protocol may be, alternatively, integrated into, integral to or otherwise combined with the communication protocol. The communication protocol, in turn, may be any standard, non-standard and/or proprietary protocol for exchanging the formatted data over the communication network. Typically, the communication protocol follows or is a function of a format of the communication network.

For example, the communication protocol for the communication network when embodied as the wireless communications system 114 is a wireless communication protocol, such as any of 1G, 2G, 2.5 and/or 3G communication protocol (e.g. CDMA, UTMS, GSM, etc.), wireless local area network protocol (e.g., IEEE 802.11), wireless personal area network protocol, the Bluetooth standard, and the like. If, on the other hand, the communication network is embodied as the Internet 116 or other packet-data network, then the communication protocol may be any packet-data protocol, such as a protocol based-on, derived from or otherwise associated with the Open Systems Interconnection (OSI) model, the Internet Protocol model, etc.

At process block 708, the distribution server 110 distributes the formatted data over the communication network to one or more of the GPS devices 112 that require the formatted data. If the formatted data is also secured, then the distribution server 110, using one or more of the appropriate security directives, distributes the formatted data over the communication network to one or more of the authorized GPS devices 113. At process block 710, any of GPS devices 112 and/or any of the authorized GPS devices 113 (or only the GPS devices 113, if secured) obtain the formatted data in accordance with the communication protocol.

At optional process block 712, the authorized GPS devices 113 remove any of the security directives applied to formatted data to recover the recent set of LT-STD. Before doing this, however, the authorized GPS devices 113 may have to prove that they are authorized to remove the security directives. This may be done by way of substantiating appropriate security credentials, which may include, for example, using a cipher or other key to strip the security directives from the formatted data.

To substantiate the appropriate security credentials, however, the authorized GPS devices 113 have to be authorized to do so. This may be done by sending to the distribution server 110 (prior to or after distribution of the formatted data) respective requests for the security credentials. If authorized, the distribution server 110, in turn, sends to the authorized GPS devices 113 their respective security credentials. Alternatively, the authorized GPS devices 113 may obtain the security credentials from a third party (not shown), such as a marketplace server, a front office server, a service provider (man or machine), etc. Alternatively, the authorized GPS devices 113 may be preconfigured with the security credentials.

In any case, the authorized GPS devices 113 may require a fee arrangement and payment-validating information to substantiate payment of the fee arrangement to obtain the security credentials. The fee may be any of a subscription-fee arrangement, one-time-fee arrangement, one-time-activation-fee arrangement, prepaid-fee arrangement, renewal-fee arrangement, etc. The fee arrangements may be based on usage. For example, the fee arrangement may be based upon (i) the particular recent set of LT-STD requested or to be distributed, (ii) the number of times (i.e., a frequency) of delivery of the recent set of LT-STD, (iii) a quantity of the recent set of LT-STD requested or to be distributed, (iv) etc. Many other fee arrangements are possible as well.

The payment-validating information may include, for example, subscription information, credit information, prepaid-fee-arrangement information, debit information, checking account information, savings account information; and/or any other information to substantiate that the authorized GPS devices 113 have paid or is operable to pay for the recent set of LT-STD.

By requiring the authorized GPS devices 113 to substantiate the appropriate security credentials, the GPS devices 112 or other entities (man and/or machine) may be denied from accessing the recent set of LT-STD underlying the formatted data. This way, the GPS devices 112 or other entities (man and/or machine) have to undergo the foregoing to become one of the authorized GPS devices 113. This may require a fee arrangement and payment-validating information to substantiate payment of the fee arrangement before being able to obtain the security credentials.

The distribution process 700 terminates at termination block 714 after the GPS devices 112 and/or the authorized GPS devices 113 obtain the recent set of LT-STD from the formatted data. After the GPS devices 112 and/or the authorized GPS devices 113 obtain the recent set of LT-STD, which may include orbit data, the GPS devices 112 and/or the authorized GPS devices 113 may operate continually for many days without needing to download fresh broadcast ephemeris from the satellites or any other source.

Figure 8:
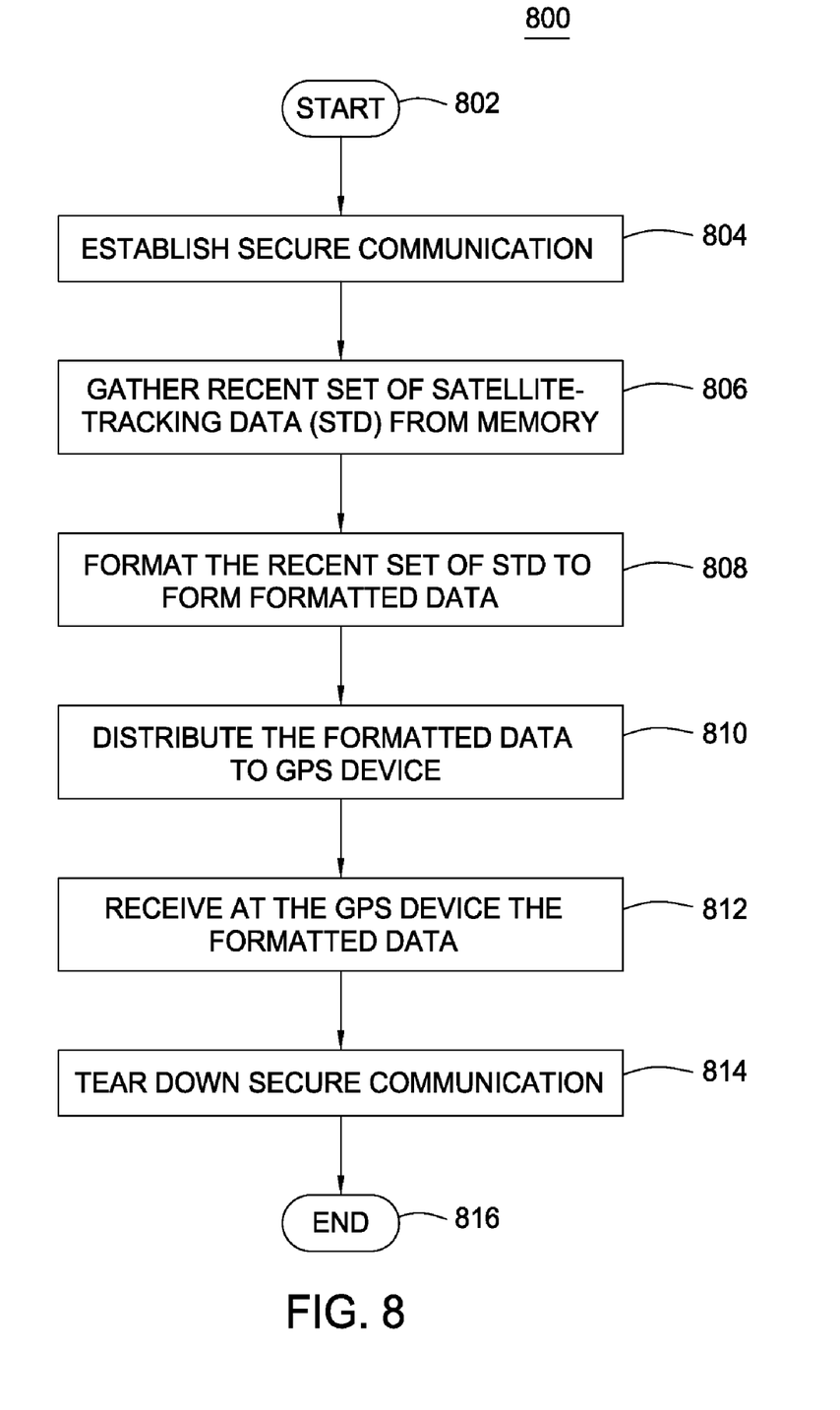
FIG. 8 is a flow diagram illustrating another example of a distribution process for distributing long-term STD information.

FIG. 8 is a flow diagram illustrating another example of a distribution process 800 for distributing LT-STD information. The distribution process 800 is described with reference to the system 100 of FIG. 1 for convenience. For simplicity, the distribution process 800 is also described below with reference to only one of the authorized GPS devices 113 and the distribution server 110. The distribution process 800, however, may be performed using any of the GPS devices 112, and/or any of the authorized GPS devices 113.

The distribution process starts at termination block 802 and transitions to process block 804. At process block 804, the authorized GPS device 113 may establish respective a secure communication session with the distribution server 110 via the communication network so as to prevent unauthorized access to and/or tampering with the LT-STD to be distributed to such authorized GPS devices. This secure communication session may employ any of the aforementioned security directives, including any of the cryptosecurity, transmission security and traffic-flow security directives, and may be, for example, embodied as a virtual private network (secured, trusted, or otherwise). The secure communication sessions may employ other secure communication channels or tunneling as well.

As part of establishing the secure communication session, the authorized GPS device 113 and/or the distribution server 110 may provide authentication consistent with the security directives so as to ensure that the authorized GPS device 113 and the distribution server are as they claim to be. The authentication may be performed using any or any combination of a login name, a password, a token, a card key, a fingerprint, retinal scan, or any other of the security credentials noted above.

After the secure communication session is established, the distribution server 110 accesses (e.g., queries and received from) the STD database 108 to gather a recent (e.g., the most) set of the LT-STD, as shown in process block 804. After process block 804, the distribution server 110 uses trajectory-conversion software 111 to format, and if desired, to secure via a security module 111a this recent set of LT-STD so as to form the formatted data as shown in process block 808. The trajectory-conversion software 111 and security module 111a may format and secure the formatted data according to the security directives of the appropriate communication protocol and/or security protocol, respectively, for the secure communication session.

These security directives are devised as above, so as to ensure to the authorized GPS device 113 that the recent set of LT-STD underlying the formatted data is authentic, unmodified and/or unadulterated. If the secure communication session is embodied as a virtual private network, then the secured communication session may use, for example, encryption and decryption techniques in accordance with the Advanced Encryption Standard, RSA, Elliptic Curve Cryptosystems, etc.

At process block 810, the distribution server 110 distributes the formatted data via the secure communication session to the authorized GPS device 113. At process block 812, the authorized GPS device 113 obtains the formatted data in accordance with the communication protocol. If also secured, then the authorized GPS device 113 removes any of the security directives applied to formatted data to recover the recent set of LT-STD, as for example, described above with respect to optional process block 712 (FIG. 7).

At process block 814, the authorized GPS device 113 and the distribution server 110 tear down the secured communication session in accordance with the communication protocol used to establish the secured communication session. The distribution process 800 terminates at termination block 814 after the authorized GPS device 113 obtains the recent set of LT-STD from the formatted data.

As above, after the authorized GPS device 113 obtains (or any of the GPS devices 112-113 that use the distribution process 800 obtain) the recent set of LT-STD, which may include orbit data. Accordingly the authorized GPS device 113 (or any of the GPS devices 112-113 that use the distribution process 800) may operate continually for many days without needing to download fresh broadcast ephemeris from the satellites or any other source.

The orbit data distributed to the GPS devices 112 and/or the authorized GPS devices 113 may be in the same format as broadcast ephemeris or may be some other model format as defined by the GPS devices 112 and/or the authorized GPS devices 113.

Herein the orbit data is generally referred to as a satellite tracking model (STM). Loading or transferring the STM to the GPS devices 112 and/or the authorized GPS devices 113 can be accomplished in many ways, including, for example, the distribution process 700 of FIG. 7. If any of the GPS devices 112 and/or authorized GPS devices 113 are in the form of a personal digital assistant (PDA) or other handheld device, for example, then the STM may be loaded into or transferred to such GPS devices 112 and/the authorized GPS devices 113 via (i) a cradle for the PDA, and (ii) the communication network.

The transmission may be alternatively accomplished by broadcasting the LT-STD (or a model representing all or a portion of the LT-STD) without knowledge of the specific location of the GPS devices 112 and/or the authorized GPS devices 113. As such, the distribution server 110 generally does not require the GPS devices 112 and/or the authorized GPS devices 113 to send any information to it through the communication network. When the LT-STD is broadcast using the security protocol, the authorized GPS devices 113 may need to be preconfigured with the security credentials or obtain the security credentials from the third party as noted above.

Referring back to FIG. 1, since GPS is a ranging system in and of itself, the data transmitted by the GPS satellites can be used to determine the range, range-rate and clock offsets to the GPS satellites from a set of tracking stations. This set of observations generated by the tracking stations 102 is used in the orbit determination process, and in the estimation of the satellite clock characteristics. The set of monitoring stations 102 could be a single station, a public network such as the Continuously Operating Reference System (CORS), or a privately owned and/or operated network.

Figure 2:
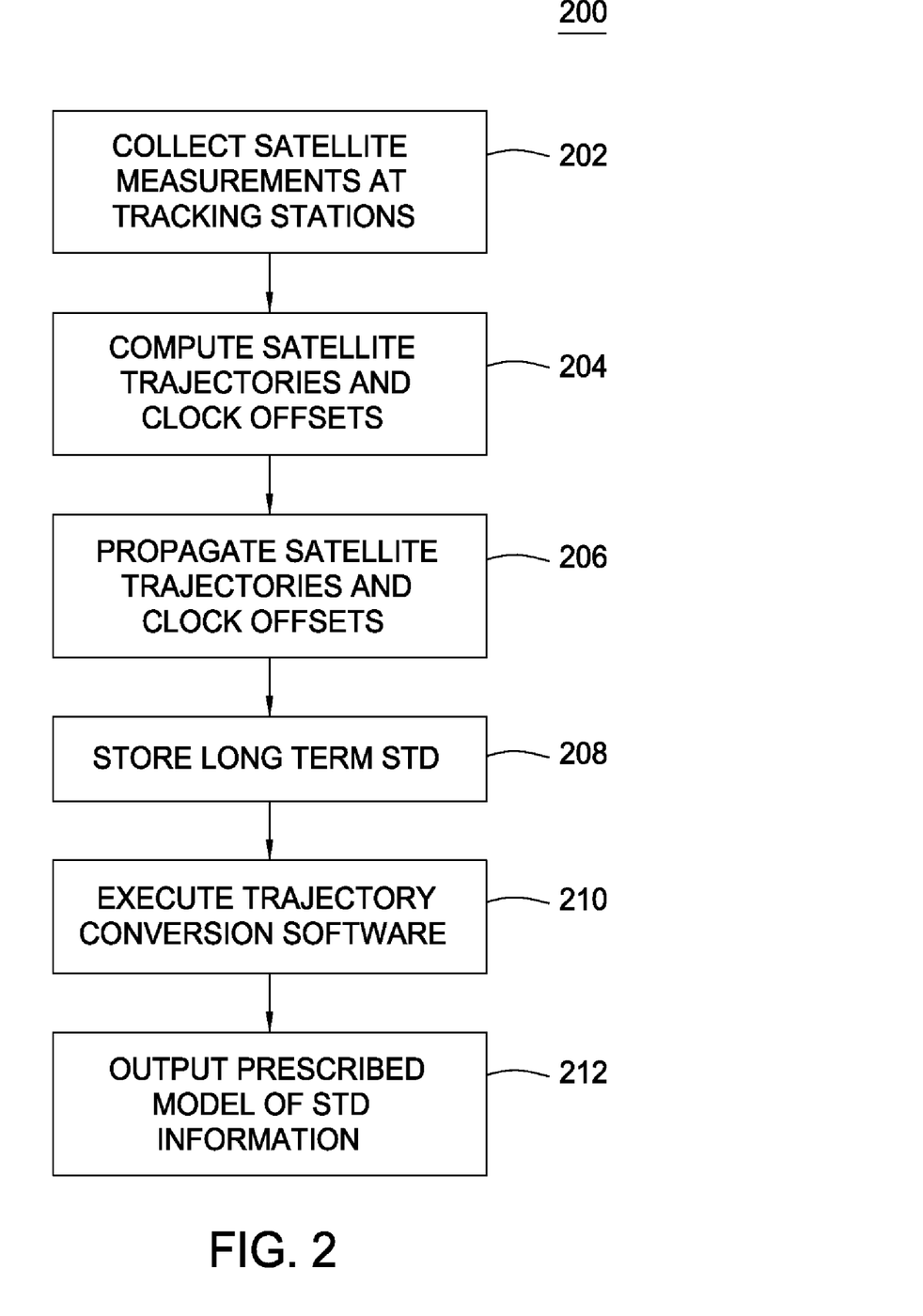
FIG. 2 depicts a method for forming the STD from the satellite measurements made at satellite tracking stations.

FIG. 2 illustrates the preferred embodiment of a process for computing LT-STD. The process begins at step 202 with the collection of satellite measurements from the network of tracking stations. Measurements such as code phase, (CP), carrier phase (CPH), and Doppler may be used for GPS satellite tracking information. At step 204, the measurements are used to compute the satellite trajectories and clock offsets over the periods during which the data was collected. This step is performed using standard GPS processing techniques and software packages well known in the art. Examples of this type of software are GIPSY from the Jet Propulsion Laboratory (JPL), GEODYN from NASA Goddard Space Flight Center (GSFC), and the commercial product, MicroCosm, from Van Martin Systems.

At step 206, the satellite trajectories and clock offsets from step 204 are propagated into the future with the same software package, using standard orbit models, such as gravity, drag, solar radiation pressure, tides, third body effects, precession, nutation, and other conservative and non-conservative forces effecting the satellite trajectory. These are normally the same force models that are used in the estimation of the satellite orbits during the data fit interval. A subset of these models, such as those for drag and solar radiation pressure, are adjusted during the orbit estimation process described in step 204 to best fit the trajectory. This combination of known and estimated force models parameters is used in the propagation 206 to provide the propagated orbit for time outside the data fit interval. The clock offsets for GPS satellites are typically very small, and change linearly over time. These clock offsets are propagated into the future using standard models, such as a second order model containing clock offset, drift, and drift rate.

At step 208, the propagated satellite trajectories and/or clock offsets are stored as STD in a database. At step 210, the trajectory conversion software converts the LT-STD data into a model and format expected by the GPS device to which the model is to be provided. At step 212, the prescribed model or information is output. The prescribed model may be output in accordance with the distribution process 700 of FIG. 7. For use with existing GPS receivers, such as the GPS devices 112 and/or the authorized GPS devices 113 (collectively hereinafter "GPS devices 112-113"), the preferred embodiment of the model is the GPS ephemeris model as described in ICD-GPS-200 and an ephemeris model is generated from the LT-STD for each 4 hour period as illustrated in the timeline 300 of FIG. 3, i.e., a different model 301, 302 and so on is generated for each six hour period. As such, the plurality of models 301, 302 and so on cumulatively span the length of the available LT-STD.

In an alternate embodiment, at step 204 (FIG. 2), the satellite trajectories and clock offsets may be estimated using the data broadcast by the satellites and the standard equations given in ICD-GPS-200c.

The orbit model is a mathematical representation of the satellite trajectory that describes the trajectory as a function of a small number of variables and eliminates the need to provide satellite position vectors explicitly as a table of time vs. satellite positions. An example of an ephemeris model is the classic six element Keplerian orbital model. Although this model lacks long term accuracy, it is a functional ephemeris model for providing satellite trajectory information as a function of a small number of variables. In the preferred embodiment, the model used to describe the trajectory is GPS standard ephemeris, specified in ICD-GPS-200c, following the same conventions and units. This is the preferred method to provide maximum compatibility with existing GPS receivers, such as the GPS devices 112-113. However, other orbit models could also be used to represent the satellite trajectory. Orbit models can be selected to provide increased accuracy, longer duration fits, more compact representation of the trajectory, or other optimizations required in an application.

This invention is different from the current art in that the orbit model provided to the GPS devices 112-113 is not the ephemeris data broadcast by the GPS satellites. Current art downloads the ephemeris broadcast from the GPS satellites and retransmits that data to GPS devices. In this invention, the broadcast ephemeris data is not required at any stage and is not used in the preferred implementation.

The broadcast ephemeris data provided by the GPS satellites cover a specific time period (typically 4 hours) and the end of that time the information becomes unusable. For example, if a device receives a broadcast ephemeris that will expire in 5 minutes, the device would need the new broadcast ephemeris before operating outside that 5 minute interval. With this invention, the STD may be formatted for the time period required by the device. This time period may be for the current time forward or may be for some time interval in the future. For example, a device, such as any of the GPS devices 112-113, may request orbit information in the standard GPS ephemeris format for the current time. In this case, the ephemeris provided to any of GPS devices 112-113 would be valid for the next 6 hours. Any of the GPS devices 112-113 could request orbit information for the next 12 hours in the standard GPS format, which, for example, could be supplied as two six hour ephemeris orbit models. In addition, different orbit models and formats that support different accuracies and standards can be generated from the LT-STD.

Fitting the LT-STD to the desired orbit model can be accomplished in a number of mathematical methods. The preferred embodiment is a least-squares fit of the orbit model parameters to the trajectory data. Other methods, such as Kalman filters or other estimators can also be used to obtain the orbit model parameters that best fit the trajectory data. These techniques of fitting data to orbit models are well known to people skilled in the art of orbit determination and orbit modeling.

Figure 4:
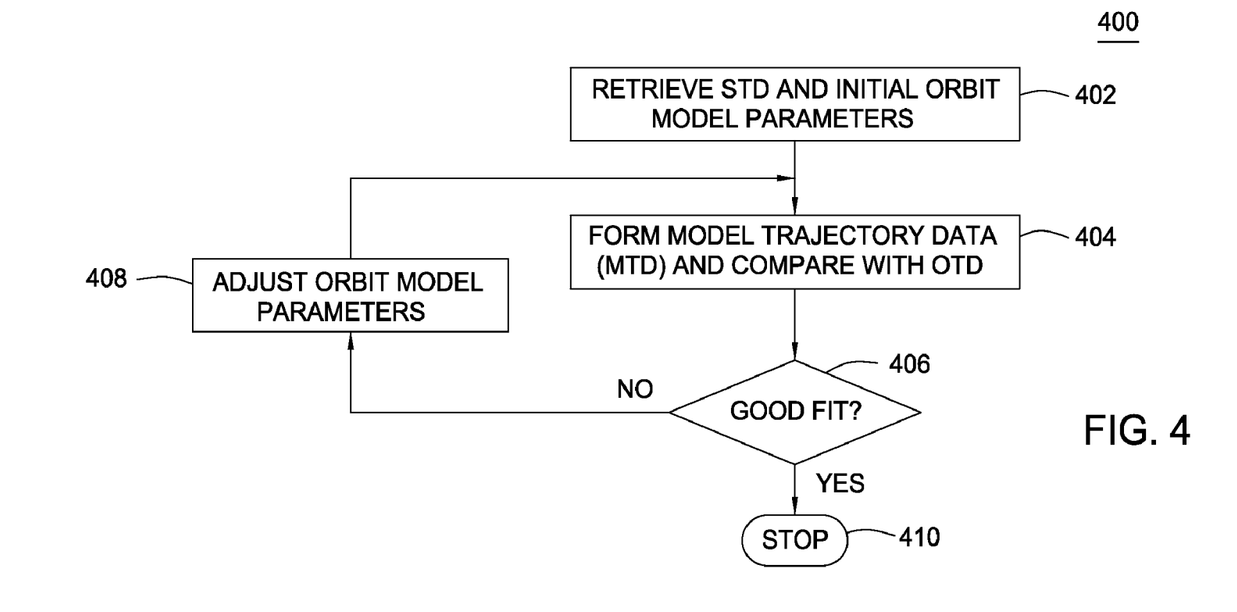
FIG. 4 depicts a flow diagram of a method that uses a least squares estimation technique to update parameters in an orbit trajectory model.
Figure 6:
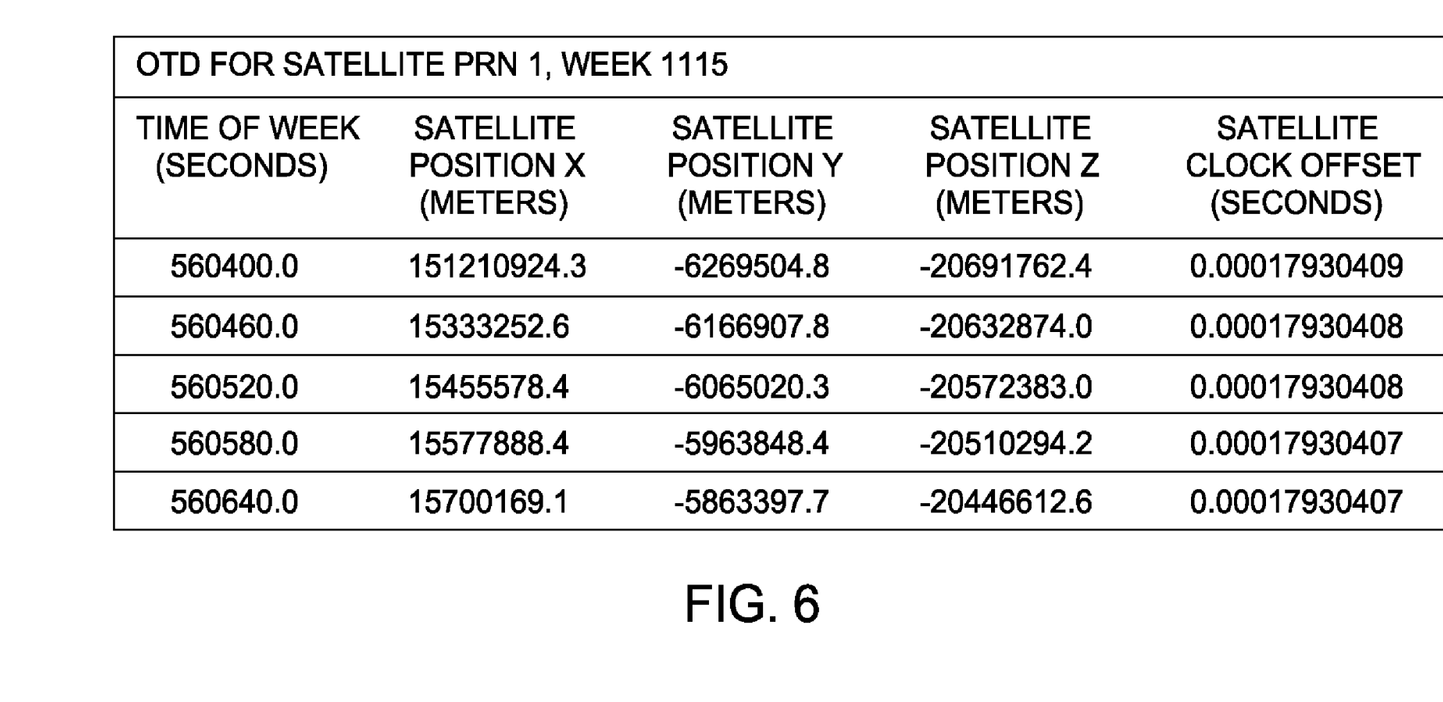
FIG. 6 depicts an example of a data table that could be used in an STD database.

The least squares technique provides an optimal fit of the trajectory data to the orbit model parameters. FIG. 4 depicts a flow diagram of a method of generating an orbit model using a least squares estimation technique. One embodiment of LT-STD is a table representation of time, position, and clock offset for each satellite, as shown in FIG. 6. The time, position, and clock offset can be in any time/coordinate system. For the purpose of simplicity and illustration, the time/coordinate system is GPS time and Earth-Centered-Earth-Fixed (ECEF) position in the World Geodetic Survey 1984 (WGS-84) reference frame.

At step 402, the STD for the desired time interval is extracted from the STD database. The orbit model parameters are initialized to the orbit model values obtained by a similar process for the previous interval. This guarantees that the initial orbit model parameters are a good fit at least for the beginning of the desired time interval. The rest of the process 400 will ensure that the parameters are adjusted so that they become a good fit for the entire time interval.

In the preferred embodiment there are 15 orbital parameters to be adjusted:

Square root of semi-major axis (meters^½)
Eccentricity (dimensionless)
Amplitude of sine harmonic correction term to the orbit radius (meters)
Amplitude of cosine harmonic correction term to the orbit radius (meters)
Mean motion difference from computed value (radians/sec)
Mean anomaly at reference time (radians)
Amplitude of cosine harmonic correction term to the argument of latitude (radians)
Amplitude of sine harmonic correction term to the argument of latitude (radians)
Amplitude of cosine harmonic correction term to the angle of inclination (radians)
Amplitude of sine harmonic correction term to the angle of inclination (radians)
Longitude of ascending node of orbit plane at weekly epoch (radians)
Inclination angle at reference time (radians)
Rate of inclination angle (radians/sec)
Argument of perigee (radians)
Rate of right ascension (radians/sec) Although it will be readily apparent that more terms may be used, for better fits, or, fewer terms may be used for a more compact model.

At step 404, the orbit model is used to predict what the trajectory would be, the predicted data is denoted the "Model Trajectory Data" (MTD). If the model were perfect, the MTD would coincide exactly with the STD. At step 406, the MTD and OTD are compared to see how closely the orbit model fits the orbit data. In the preferred embodiment, the comparison step 406 is performed by summing the squares of the differences between each trajectory point in the OTD and the corresponding point in the MTD, and comparing the resulting sum to a threshold. If the fit is "good", the model parameters are deemed "good" and the process stops at step 410. If the fit is not good then the model parameters are adjusted at step 408. There are many techniques well known in the art for adjusting model parameters to fit data. For example, in FIG. 5, the six-hour ephemeris model was adjusted to fit six hours of OTD using a subspace trust region method based on the interior-reflective Newton method described in Coleman, T. F., and Y. Li, "On the convergence of reflective Newton methods for large scale nonlinear minimization subject to bounds", *Mathematical Programming*, Vol. 67, Number 2, pp. 189-224, 1994, and Coleman, T. F., and Y. Li, "An interior, trust region approach for nonlinear minimization subject to bounds", *SIAM Journal on Optimization*, Vol. 6, pp. 418-445, 1996. There are standard computer packages, e.g., MATLAB Optimization Toolbox, which may be used to implement these methods.

Steps 404, 406 and 408 are repeated until the model parameters are found that fit the OTD well.

Figure 3:
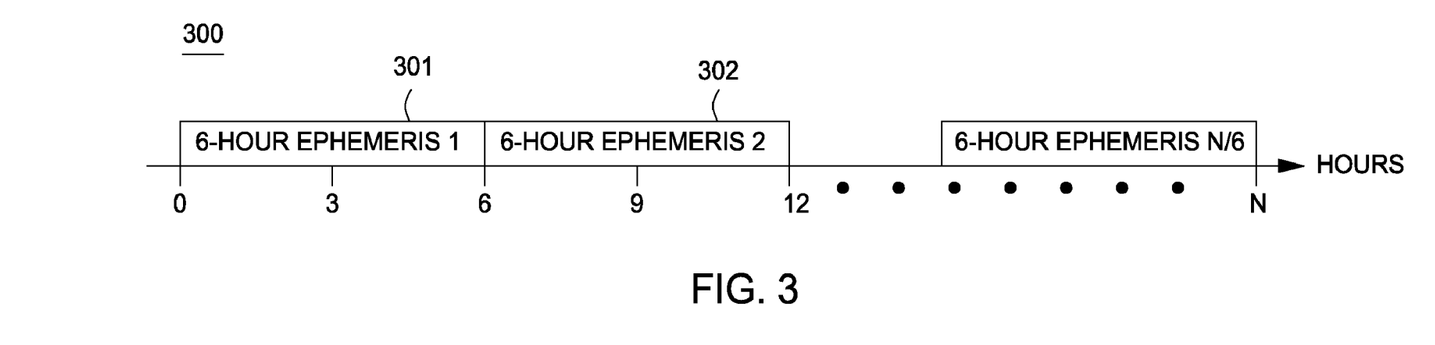
FIG. 3 depicts a timeline of STD data that conforms to the broadcast ephemeris format models as described in ICD-GPS-200C yet spans many hours.

When fitting an orbit model to trajectory data, there are many choices of which orbit model to choose. The preferred embodiment is to use orbit models with parameters that have been defined in well-known standards. In one embodiment, the ephemeris parameters defined in the GPS interface control document, ICD-GPS-200c, are used. The ICD-GPS-200c definition includes a bit that specifies a 4-hour fit or a 6-hour fit. Typically, the satellite data is broadcast in 4-hour fits and, by the time this data is obtained by the observer of the satellite, the data is often near the end of its fit interval. In one embodiment of the current invention, sequential 6 hour windows of STD are used to create 6-hour ephemeris models, using the technique described in FIG. 4 and the accompanying text. This produces a set of ephemeris models as illustrated in FIG. 3. Although these particular 6-hour models are not available without this invention, the models nonetheless are defined using standard parameters (i.e. ICD-GPS-200c) and will be understood by any device that was designed to be compatible with said standard, such as any of the GPS devices 112-113.

Alternatively, the transmission time for the model may be dynamically determined in response to various transmission network characteristics, e.g., cellular telephone rate structures, data transmission bandwidths, low network utilization periods, low network congestion periods and the like. Thus, the invention determines present value of the specific characteristics and compares the present value to a threshold. In response to the comparison, the invention will transmit or not transmit the model. For example, the invention may monitor the network traffic and determine the least congested time to transmit the model. Many wireless networks have time varying rates. For example, cellular telephone use is often less expensive on weekends compared to mid-week rates. A useful embodiment of the current invention is to create a satellite tracking model that is valid for the period between inexpensive rates (example: valid from one Saturday to the next), and transmit the model during the time that the rate is inexpensive. As such, the model is transmitted for less cost than if the models were transmitted during a peak rate period. Also, or as an alternative, one may define and send the model to coincide with periods of low data use on the network—whether the network is wireless or not (e.g. the internet). Those skilled in the art will realize that many other transmission time optimization characteristics can be used to determine when it is best to transmit the model to the receiver(s), such as the GPS devices 112-113.

Figure 5:
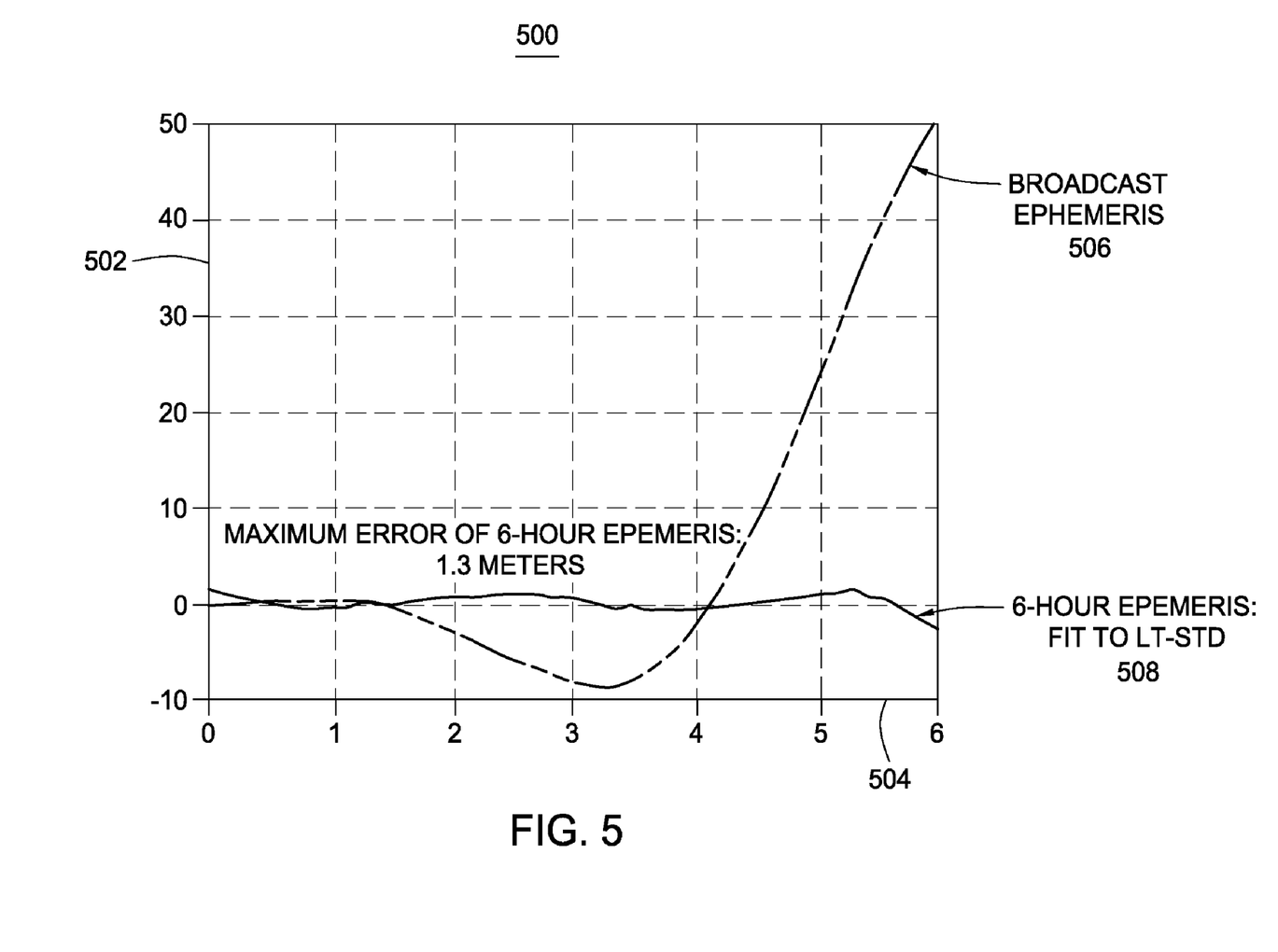
FIG. 5 depicts the error in the orbit model derived from the STD, and compares the error to the error in the broadcast ephemeris.

FIG. 5 shows an example of Satellite Tracking Data (STD) that was generated for a time interval of greater than six hours. Then, using the technique described by FIG. 4 and accompanying text, parameters of an ICD-GPS-200c ephemeris model were adjusted to give a best fit to 6 hours of the STD. The orbit modeled by this 6-hour ephemeris was then compared to the true trajectory, and for comparison, the true trajectory was also compared to the orbit modeled by the broadcast ephemeris. The results are shown in FIG. 5, illustrating how the broadcast ephemeris loses validity while the ephemeris created by this invention maintains its validity with approximately one meter of error.

The clock offset of GPS satellites is easily modeled by three parameters. In the preferred embodiment, the measured clock offset is modeled by the three parameters defined in ICD-GPS-200c. These parameters represent clock offset, drift, and drift rate. The parameters are adjusted in a similar way to the method 400 described above to give a model that best fits the measured data over the time interval.

Alternative embodiments may use longer fit intervals, such as 8, 14, 26, 50, 74, 98, 122, or 146 hours for each ephemeris model. These fit intervals are envisaged in ICD-GPS-200c, but are seldom, if ever, available from the broadcast ephemeris. Under the current invention, models with these fit intervals may be generated even when the broadcast ephemeris is limited to a 4-hour fit interval.

Alternative embodiments of the STD data may include observed satellite velocity, acceleration, clock drift, or clock drift rate and these terms may be used in the process of fitting a model in ways which are well known in the art.

Another embodiment of an orbit model uses the spare data bits in the current ephemeris format of a conventional GPS signal to provide additional model parameters that would improve the data fit over long time intervals. For example, subframe 1 has 87 spare bits that are available for additional parameters. This technique allows for more parameters to describe the orbital motion of the satellites without compromising the standard data format. This new ephemeris model is based on the current ephemeris model with additional correction terms used to augment the model to support the longer fit intervals with greater accuracy.

Yet another embodiment of an orbit model is to develop a new set of orbital parameters that describe the satellite orbit which are different, in part or in their entirety, from the GPS ephemeris model parameters. With the goal of making the fit interval longer, different parameters may provide a better description of the satellite orbit. This new set of parameters could be defined such that they would fit into the existing data structures, however, their implementation and algorithms for use would be different.

Still a further embodiment of an orbit model would be to develop a new set of orbital parameters that would not fit into the existing GPS ephemeris model format. This new set of parameters would be developed to better address the trade-off between the numbers of parameters required, the fit interval, and the orbit accuracy resulting from the model. An example of this type of ephemeris parameter set is Brouwer's theory that could be used as is or modified to account for GPS specific terms. Brouwer's theory as described in Brouwer, D. "Solution of the Problem of Artificial Satellite Theory without Drag", Astron J. 64: 378-397, November 1959 is limited to satellites in nearly circular orbits such as GPS satellites.

Another embodiment is to use a subset of the standard ephemeris parameters defined in ICD-GPS-200c. This approach is particularly useful when bandwidth and/or packet size is limited in the communication link that will be used to convey the orbit model to a remote GPS receiver, such as any of the GPS devices 112-113. In one such embodiment, the fifteen orbit parameters described above, and in ICD-GPS- 200c, may be reduced to a subset of 9 parameters, by setting all harmonic terms in the model to zero:

Square root of semi-major axis (meters^½)
Eccentricity (dimensionless)
Mean motion difference from computed value (radians/sec)
Mean anomaly at reference time (radians)
Longitude of ascending node of orbit plane at weekly epoch (radians)
Inclination angle at reference time (radians)
Rate of inclination angle (radians/sec)
Argument of perigee (radians)
Rate of right ascension (radians/sec)

Process 400 is then executed using this subset of parameters. This reduces the amount of data that must be sent to the remote GPS receiver. The remote GPS receiver can then reconstruct a standard ephemeris model by setting the "missing" harmonic terms to zero. There are a large number of alternative embodiments to reduce the size of the data, while still providing a model that fits the STD, including:

- removing parameters from the model, and replacing them with a constant, such as zero—as done above—or some other predetermined value that is either stored in the remote GPS receiver or occasionally sent to the receiver;
- the resolution of the parameters may be restricted in the process 400—this too reduces the amount of data that must be sent to the remote GPS receiver; and/or
- parameters, which are similar among two or more satellites, may be represented as a master value plus a delta, where the delta requires fewer bits to encode; an example of this is the parameter Eccentricity, which changes very little among different GPS satellites.

Some of these approaches reduce the ability of the model to fit the data over a period of time (e.g., six hours). In this case, the fit interval may be reduced (e.g. to four hours) to compensate.

While the foregoing is directed to the preferred embodiment of the present invention, other and further embodiments of the invention may be devised without departing from the basic scope thereof, and the scope thereof is determined by the claims that follow.

What is claimed is:

1. A method for distributing long term satellite tracking data to a remote receiver comprising:
    extracting from memory at least a portion of long-term-satellite-tracking data;
    generating formatted data from the at least a portion of long-term-satellite-tracking data, the formatting data being in a format supported by the remote receiver;
    applying security to the formatted data to prevent unauthorized access to the at least a portion of long-term-satellite-tracking data; and
    transmitting the formatted data to the remote receiver.

2. The method of claim 1, wherein applying security to the formatted data comprises encrypting the formatted data to prevent unauthorized access to the at least a portion of long-term-satellite-tracking data.

3. The method of claim 1, wherein applying security to the formatted data operates to ensure to the remote receiver that the at least a portion of long-term-satellite-tracking data is unadulterated.

4. The method of claim 1, wherein the long-term-satellite-tracking data comprises at least one of: a plurality of satellite positions with respect to time for a period of time into the future, and a plurality of satellite clock offsets with respect to time for a period of time into the future.

5. The method of claim 1, wherein the long-term-satellite-tracking data comprises at least one of: data representative of satellite positions, velocities or acceleration; data representative of satellite clock offsets, drift, or drift rates.

6. The method of claim 1, wherein the long-term-satellite-tracking data is valid for a first period of time, wherein the at least a portion of the long term satellite tracking data is valid for a second period of time, and wherein the first period is longer than the second period.

7. The method of claim 1, wherein applying security to the formatted data comprises applying any of cryptosecurity, transmission security, emission security, and traffic-flow security to prevent unauthorized access to the at least a portion of long-term-satellite-tracking data.

8. The method of claim 1, wherein applying security to the formatted data comprises applying a security protocol and a communication protocol to the formatted data, wherein the security protocol is combined with a communication protocol.

9. The method of claim 1, further comprising:
    receiving from the remote receiver a request for security credentials for removing the security from the formatted data; and
    sending to the remote receiver the security credentials.

10. The method of claim 9, further comprising: ensuring that, prior to sending the security credentials, payment for the remote receiver to obtain the at least a portion of long-term-satellite-tracking data is accounted for.

11. The method of claim 10, wherein the payment for the remote receiver to obtain the at least a portion of long-term-satellite-tracking data is a fee arrangement.

12. The method of claim 9, further comprising:
    sending to the remote receiver a request for information to substantiate that the remote receiver authorized to access the at least a portion of long-term-satellite-tracking data; and
    receiving from the remote receiver the information to substantiate that the remote receiver authorized to access the at least a portion of long-term-satellite-tracking data.

13. The method of claim 12, further comprising: ensuring that, prior to sending the security credentials, payment for the remote receiver to obtain the at least a portion of long-term-satellite-tracking data is accounted for, wherein the information to substantiate that the remote receiver authorized to access the at least a portion of long-term-satellite-tracking data comprises information to validate the payment for the remote receiver to obtain the at least a portion of long-term-satellite-tracking data.

14. The method of claim 1, wherein the transmitting the formatted data comprises: transmitting the formatted data over a wireless communications link.

15. A method for obtaining at a remote receiver long-term-satellite-tracking data distributed over a communications link, the method comprising:
    receiving at the remote receiver formatted data, wherein the formatted data comprises at least a portion of long-term-satellite-tracking data that is extracted from memory of a device remote from the remote receiver, formatted in a format supported by the remote receiver, and applied with security to prevent unauthorized access to the at least a portion of long-term-satellite-tracking data; and
    removing the security from the formatted data.

16. The method of claim 15, wherein the security comprises encryption, and wherein removing the security comprises decrypting the encryption to access the formatted data.

17. The method of claim 15, wherein removing the security from the formatted data comprises ensuring that the at least a portion of long-term-satellite-tracking data is unadulterated.

18. The method of claim 15, wherein removing the security from the formatted data comprises removing any of cryptosecurity, transmission security, emission security, and traffic-flow security used to prevent unauthorized access to the at least a portion of long-term-satellite-tracking data.

19. The method of claim 15, further comprising:
sending from the remote receiver a request for security credentials for removing the security from the formatted data; and
receiving at the remote receiver the security credentials, wherein removing the security from the formatted data comprises substantiating the security credentials to remove the security from the formatted data.

20. The method of claim 19, further comprising: supplying, in response to a request for information to substantiate that the remote receiver authorized to access the at least a portion of long-term-satellite-tracking data, payment for the remote receiver to obtain the at least a portion of long-term-satellite-tracking data is accounted for.

21. An apparatus for distributing long term satellite tracking data to a remote receiver comprising:
memory for storing long-term-satellite-tracking data and executable instructions; and
logic for executing the executable instructions to:
extract from the memory at least a portion of long-term-satellite-tracking data;
generate formatted data from the at least a portion of long-term-satellite-tracking data, the formatting data being in a format supported by the remote receiver;
apply security to the formatted data to prevent unauthorized access to the at least a portion of long-term-satellite-tracking data; and
transmit the formatted data to the remote receiver.

22. The apparatus of claim 21, wherein the executable instructions to apply security to the formatted data comprises executable instructions to encrypt the formatted data to prevent unauthorized access to the at least a portion of long-term-satellite-tracking data.

23. The apparatus of claim 21, wherein the executable instructions to apply security to the formatted data comprises executable instructions to ensure to the remote receiver that the at least a portion of long-term-satellite-tracking data is unadulterated.

24. The apparatus of claim 21, wherein the long-term-satellite-tracking data comprises at least one of: data representative of satellite positions, velocities or acceleration; data representative of satellite clock offsets, drift, or drift rates.

25. The apparatus of claim 21, wherein the executable instructions to apply security to the formatted data comprises executable instructions to apply any of cryptosecurity, transmission security, emission security, and traffic-flow security to prevent unauthorized access to the at least a portion of long-term-satellite-tracking data.

26. The apparatus of claim 21, wherein the executable instructions to apply security to the formatted data comprises executable instructions to apply a security protocol and a communication protocol to the formatted data, wherein the security protocol is combined with a communication protocol.

27. The apparatus of claim 21, wherein the logic is further operable to execute executable instructions to:
receive from the remote receiver a request for security credentials for removing the security from the formatted data; and
send to the remote receiver the security credentials.

28. The apparatus of claim 27, wherein the logic is further operable to ensure that, prior to sending the security credentials, payment for the remote receiver to obtain the at least a portion of long-term-satellite-tracking data is accounted for.

29. The apparatus of claim 28, wherein the payment for the remote receiver to obtain the at least a portion of long-term-satellite-tracking data is a fee arrangement.

30. The apparatus of claim 27, wherein the logic is further operable to execute executable instructions to:
send to the remote receiver a request for information to substantiate that the remote receiver authorized to access the at least a portion of long-term-satellite-tracking data; and
receive from the remote receiver the information to substantiate that the remote receiver authorized to access the at least a portion of long-term-satellite-tracking data.

31. The apparatus of claim 30, wherein the logic is further operable to execute executable instructions to: ensure that, prior to sending the security credentials, payment for the remote receiver to obtain the at least a portion of long-term-satellite-tracking data is accounted for, wherein the information to substantiate that the remote receiver authorized to access the at least a portion of long-term-satellite-tracking data comprises information to validate the payment for the remote receiver to obtain the at least a portion of long-term-satellite-tracking data.

32. A method for distributing long term satellite tracking data to a remote receiver comprising:
extracting from memory at least a portion of long-term-satellite-tracking data;
generating formatted data from the at least a portion of long-term-satellite-tracking data, the formatting data being in a format supported by the remote receiver;
establishing a secure communication link with the remote receiver to prevent unauthorized access to the at least a portion of long-term-satellite-tracking data; and
transmitting the formatted data to the remote receiver via the secure communication link.

33. The method of claim 32, wherein establishing a secure communication link operates to ensure to the remote receiver that the at least a portion of long-term-satellite-tracking data is unadulterated.

34. The method of claim 32, wherein establishing a secure communication link comprises using any of transmission security and traffic-flow security to prevent unauthorized access to the at least a portion of long-term-satellite-tracking data.

35. The method of claim 32, further comprising: applying security to the formatted data to prevent unauthorized access to the at least a portion of long-term-satellite-tracking data.

36. The method of claim 35, wherein applying security to the formatted data comprises encrypting the formatted data.

37. The method of claim 35, wherein applying security to the formatted data operates to ensure to the remote receiver that the at least a portion of long-term-satellite-tracking data is unadulterated.

38. The method of claim 35, wherein applying security to the formatted data comprises applying a security protocol and a communication protocol to the formatted data, wherein the security protocol is combined with a communication protocol.

39. The method of claim 32, further comprising:
receiving from the remote receiver a request for security credentials for removing the security from the formatted data; and
sending to the remote receiver the security credentials.

40. The method of claim 39, further comprising: ensuring that, prior to sending the security credentials, payment for the remote receiver to obtain the at least a portion of long-term-satellite-tracking data is accounted for.

41. The method of claim 40, wherein the payment for the remote receiver to obtain the at least a portion of long-term-satellite-tracking data is a fee arrangement.

42. The method of claim 39, further comprising:

sending to the remote receiver a request for information to substantiate that the remote receiver authorized to access the at least a portion of long-term-satellite-tracking data; and receiving from the remote receiver the information to substantiate that the remote receiver authorized to access the at least a portion of long-term-satellite-tracking data.

43. The method of claim 32, further comprising: ensuring that, prior to sending the security credentials, payment for the remote receiver to obtain the at least a portion of long-term-satellite-tracking data is accounted for, wherein the information to substantiate that the remote receiver authorized to access the at least a portion of long-term-satellite-tracking data comprises information to validate the payment for the remote receiver to obtain the at least a portion of long-term-satellite-tracking data.

44. The method of claim 32, wherein the transmitting the formatted data comprises: transmitting the formatted data over a wireless communications link.

\* \* \* \* \*